US010675725B2

(12) United States Patent
Pettersson et al.

(10) Patent No.: US 10,675,725 B2
(45) Date of Patent: Jun. 9, 2020

(54) METHOD AND TEST ASSEMBLY FOR DETERMINING MACHINE PARAMETERS

(71) Applicant: HEXAGON TECHNOLOGY CENTER GMBH, Heerbrugg (CH)

(72) Inventors: Bo Pettersson, Luxembourg (LU); Andreas Archenti, Årsta (SE)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 187 days.

(21) Appl. No.: 15/045,905

(22) Filed: Feb. 17, 2016

(65) Prior Publication Data

US 2016/0236313 A1    Aug. 18, 2016

(30) Foreign Application Priority Data

Feb. 18, 2015 (EP) .................................. 15155654

(51) Int. Cl.
*B23Q 17/22* (2006.01)
*B23Q 17/00* (2006.01)
(Continued)

(52) U.S. Cl.
CPC .............. *B23Q 17/22* (2013.01); *B23Q 17/00* (2013.01); *B23Q 17/2233* (2013.01); *G01B 7/14* (2013.01); *G01B 21/042* (2013.01)

(58) Field of Classification Search
CPC ...... B23Q 17/22; G01B 7/14; F15B 2015/206
(Continued)

(56) References Cited

U.S. PATENT DOCUMENTS 5,111,590 A    5/1992  Park
5,440,183 A *  8/1995  Denne .................... F15B 15/00
                                                310/12.26
(Continued)

FOREIGN PATENT DOCUMENTS

CN    1688949 A    10/2005
CN  101813550 A     8/2010
(Continued)

OTHER PUBLICATIONS

Extended European Search Report dated Sep. 11, 2015 as received in Application No. 15155654.5.

*Primary Examiner* — Alexander A Mercado
(74) *Attorney, Agent, or Firm* — Maschoff Brennan

(57) ABSTRACT

The invention pertains to a method for determining machine parameters of a mechanical device in which a first element and a second element are mutually movable in settable patterns of movement, the method comprising placing a measuring arm between the first and second elements, displacing the first and second elements mutually in a predetermined intended movement path, applying a predetermined force between the first element and the second element substantially in the longitudinal direction of the measuring arm, recording the resulting actual movement path by means of the measuring arm, thereby determining a difference between the intended movement path and the actual movement path, and deriving, based on the determined difference, machine parameters indicating a condition of the mechanical device, characterized in that the predetermined force comprises a dynamically varying portion. The invention furthermore pertains to a test assembly for performing said method.

19 Claims, 4 Drawing Sheets

(51) Int. Cl.
*G01B 21/04* (2006.01)
*G01B 7/14* (2006.01)

(58) Field of Classification Search
USPC .......................................... 73/865.9; 310/338
See application file for complete search history.

(56) References Cited

U.S. PATENT DOCUMENTS

| | | | | |
|---|---|---|---|---|
| 5,671,541 A | * | 9/1997 | Dai | G01B 3/30 33/502 |
| 5,681,981 A | * | 10/1997 | McMurtry | B23Q 1/5462 33/502 |
| 6,468,082 B1 | * | 10/2002 | Denne | F15B 11/036 434/55 |
| 7,245,982 B2 | | 7/2007 | Morfino | |
| 2002/0189379 A1 | | 12/2002 | Hjelm | |

FOREIGN PATENT DOCUMENTS

| | | |
|---|---|---|
| CN | 103158035 A | 6/2013 |
| CN | 103286633 A | 9/2013 |
| GB | 2 377 023 A | 12/2002 |

\* cited by examiner

METHOD AND TEST ASSEMBLY FOR DETERMINING MACHINE PARAMETERS

FIELD

The present invention relates to a method for determining machine parameters and a test assembly for performing said method. The method and test assembly according to the invention can be used with basically any kind of mechanical structure, such as machine tools, robots or coordinate measuring machines.

BACKGROUND

In many contexts, industry uses various types of machine tools for processing and manufacturing various parts. This involves the need to be able to monitor the status of such machines in order, for example, to be able to do repairs and adjustments in time to avoid stoppages or bad precision of parts being manufactured. The objective is to be able to detect changes quickly and to be able to rectify them before major and expensive defects develop.

A conventional method for testing a machine is to make representative parts and then check their dimensions in order to assess the machine's performance. Disadvantages observed in this respect include the need to use tools and test pieces and difficulty in comparing results from different tests. Using standardised test pieces certainly facilitates comparisons but still requires test pieces and tools.

Another method comprises monitoring the machine's rigidity in different directions by applying a suitable force by means of a hydraulic cylinder and measuring the resulting deflection by means, for example, of a micrometer. A disadvantage of this method is that it is time-consuming and measurement cannot be done with the machine in operation.

A further known practice comprises the use of a special instrument, a so-called "ball bar", fitted between workpiece holders and tool holders, to test the machine's ability to perform a circular movement. Measuring equipment in the instrument is used to record any deviations from a circle. Various such tests can be carried out at different times and compared to provide information on various characteristics of the machine, such as circularity, servo response, rectilinearity, play etc. Tests can also be done at various feed rates, in various feed directions and using bars of various lengths, and placing the workpiece holder at various different points. There nevertheless remains the disadvantage of it not being easy to gain a proper assessment of the machine's characteristics under load.

US 2002/0189379 A1 solves this problem by applying a predetermined static force between the first and second elements during mutual displacement between them, and simultaneously measuring the resulting deformation. This makes it possible to carry out machine testing in much more production-like conditions than was previously possible. Analysis can be further refined by also varying the manner in which the displacement takes place, as regards both movement configuration and direction of movement, and also by varying the magnitude of the force applied.

SUMMARY

Some embodiments of the invention provide an improved method and assembly for determining machine parameters of a mechanical device.

Some embodiments of the invention provide such a method and assembly which allow determining the machine parameters more flexible.

A first aspect of the invention pertains to a method for determining machine parameters of a mechanical device in which a first element and a second element are mutually movable in settable patterns of movement. The method comprises placing a measuring arm between the first and second elements, displacing the first and second elements mutually in a predetermined intended movement path, applying a predetermined force between the first element and the second element substantially in the longitudinal direction of the measuring arm, recording the resulting actual movement path by means of the measuring arm, thereby determining a difference between the intended movement path and the actual movement path, and deriving, based on the determined difference, machine parameters indicating a machine's condition.

According to the invention, the predetermined force comprises a dynamically varying portion.

In one embodiment of the method according to the invention, the dynamically varying portion is time dependent or position dependent, particularly wherein the dynamically varying portion is sinusoidal, subject to an analytic function or subject to a step function.

In another embodiment, the method comprises at least one measurement operation, particularly a plurality of subsequently performed measurement operations, each of which comprising moving the first and second elements mutually in a settable pattern of movement and recording the resulting actual movement path, the predetermined force applied during each measurement operation comprising a dynamically varying portion, so that the applied force varies dynamically during each measurement operation, particularly wherein the applied dynamically varying force is different for each measurement operation.

In one embodiment of the method, the dynamically varying portion is generated at least partially by means of a piezo actuator. In an alternative embodiment, it is generated at least partially by means of a hydraulic actuator, a pneumatic actuator, an electromagnetic actuator or an electric motor.

In another embodiment of the method according to the invention, the predetermined force comprises a static portion, particularly wherein the dynamically varying portion and the static portion are generated by different means. In particular, the predetermined force is defined as $$F = F_0 + F(t),$$

where F is the predetermined force, $F_0$ is the static portion of the force and F(t) is the dynamically varying portion of the force. The static portion can be positive, negative or zero.

In yet another embodiment, the predetermined force is applied in various mutual positions between the first and second elements.

In a further embodiment of the method, recording the resulting actual movement path comprises dynamically determining a current length or a length difference of the measuring arm while the predetermined force is applied.

In one embodiment of the method according to the invention, the machine parameters comprise at least stiffness, particularly measured in at least two directions based on an applied force vector and on a deflection vector, and particularly comprising a dynamic stiffness value. In another embodiment, the machine parameters comprise at least displacement in dependence of a direction of movement, hysteresis, rectilinearity, and/or damping.

In one embodiment of the method, the mechanical device is a machine tool, wherein the first element is adapted to support a machining tool, and the second element is adapted to support a workpiece. In another embodiment, the mechanical device is a coordinate measuring machine, wherein the first element is adapted to support a measuring head, and the second element is adapted to support an object to be measured.

In one embodiment of this method, the second element is adapted to provide a fixation for holding the workpiece or the object to be measured, respectively, in its place, particularly by means of clamping, and the machine parameters comprise a stiffness of the fixation.

In a further embodiment of the method according to the invention, the mechanical device is a machine tool, and the method comprises a tooling simulation of a specific tooling operation of the machine tool, in the course of which mutual movements between the first element and the second element are performed that are typical for the tooling operation, and the dynamically varying portion is applied according to forces typically occurring during the tooling operation.

A second aspect of the invention relates to an assembly for determining machine parameters of a mechanical device in which a first element and a second element are mutually movable. The assembly comprises a measuring arm which has at its ends fastening devices for articulated fixing to the first element and the second element respectively, to make it possible to measure positional change between the first element and the second element, and a power unit that is arranged to apply a predetermined force substantially parallel with the measuring arm to the first element and the second element.

According to the invention, the power unit is arranged to apply a predetermined force that comprises at least a dynamically varying portion.

In one embodiment of the assembly according to the invention, the dynamically varying portion is time dependent or position dependent, particularly wherein the dynamically varying portion is sinusoidal, subject to an analytic function or subject to a step function.

In another embodiment of the assembly, the power unit comprises at least one piezo actuator that is adapted to generate the dynamically varying portion. In an alternative embodiment, the power unit comprises at least one hydraulic actuator, pneumatic actuator, electromagnetic actuator or electric motor that is adapted to generate the dynamically varying portion.

In yet another embodiment of the assembly, the power unit incorporates at least one working cylinder that is adapted to generate a static portion of the predetermined force; and/or is provided with a first bracket for fixing to the first element and with a second bracket for fixing to the second element, wherein the first and second brackets are each provided with a bearing allowing rotation of the power unit, particularly wherein the second bracket is provided with devices for fixing one end to the measuring arm.

In a further embodiment of the assembly according to the invention, the first element is a rotating spindle, particularly wherein the assembly comprises an adaptor for fixing the assembly to the spindle, and is adapted to measure a stiffness of the spindle, the stiffness varying with a rotational speed of the spindle.

In another embodiment, the assembly is adapted to be operated cordless and by means of a battery, the assembly particularly comprising a fixedly installed accumulator battery or means for accepting an exchangeable battery.

BRIEF DESCRIPTION OF THE DRAWINGS

The invention in the following will be described in detail by referring to example embodiments that are accompanied by figures, in which.

A more complete understanding of the components, processes, and apparatuses disclosed herein can be obtained by reference to the accompanying drawings. These figures are merely schematic representations based on convenience and the ease of demonstrating the present disclosure, and are, therefore, not intended to indicate relative size, dimensions, structural relationships, or relative positions of the devices or components thereof and/or to define or limit the scope of the exemplary embodiments.

DETAILED DESCRIPTION

Figure 1:
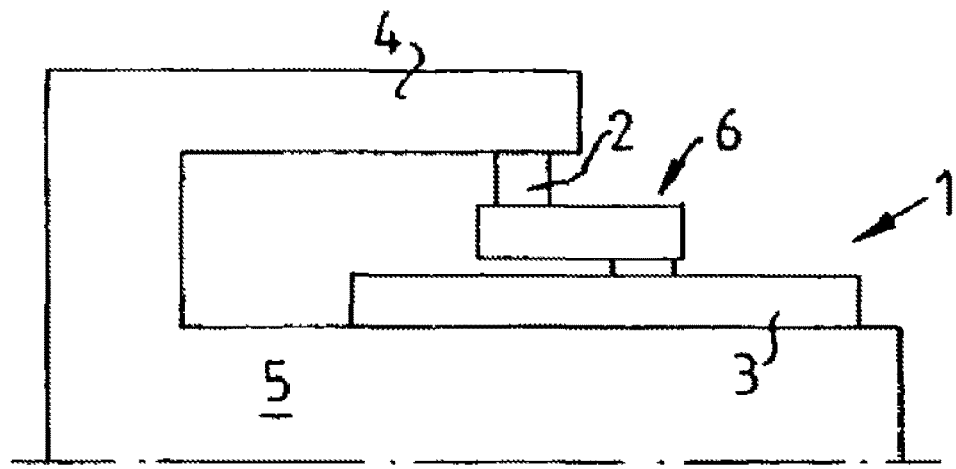
FIG. 1 shows a schematic view of a machine-tool with an example embodiment of a test assembly according to the invention.

FIG. 1 shows a schematic view of a machine-tool 1 intended for the machining of workpieces by means of a tool fitted in the machine. This machine incorporates a first element 2 in the form of a spindle, and a second element 3 in the form of a worktable, which are movable relative to one another in a conventional manner in various directions for machining of a workpiece (not depicted) which is intended to be secured to the worktable and be machined by a tool inserted in the spindle. The first element 2 is supported by a spindle head 4 which is itself supported by a frame 5 which also supports the second element 3. To test how the machine 1 behaves during mutual displacement of the first element 2 and the second element 3, a test assembly 6 described below and designed according to the invention is clamped between the first element 2 and the second element 3.

Figure 2A:
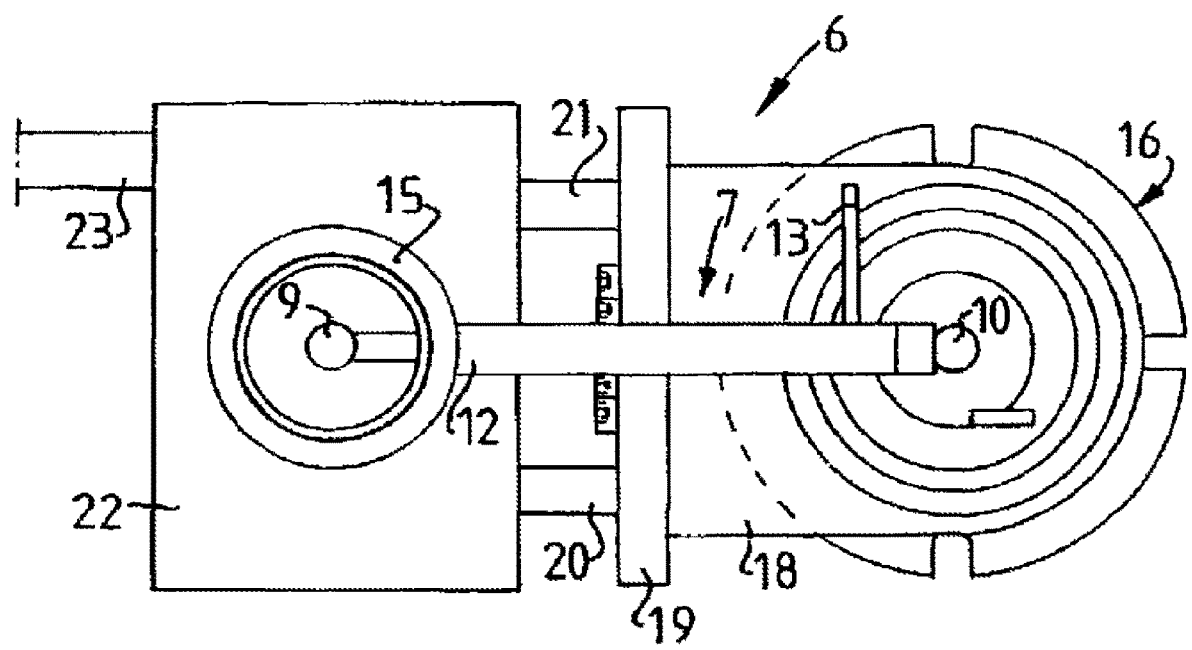
FIGS. 2a-b show an example embodiment of a test assembly according to the invention in a top view and a partly sectional side view.
Figure 2B:
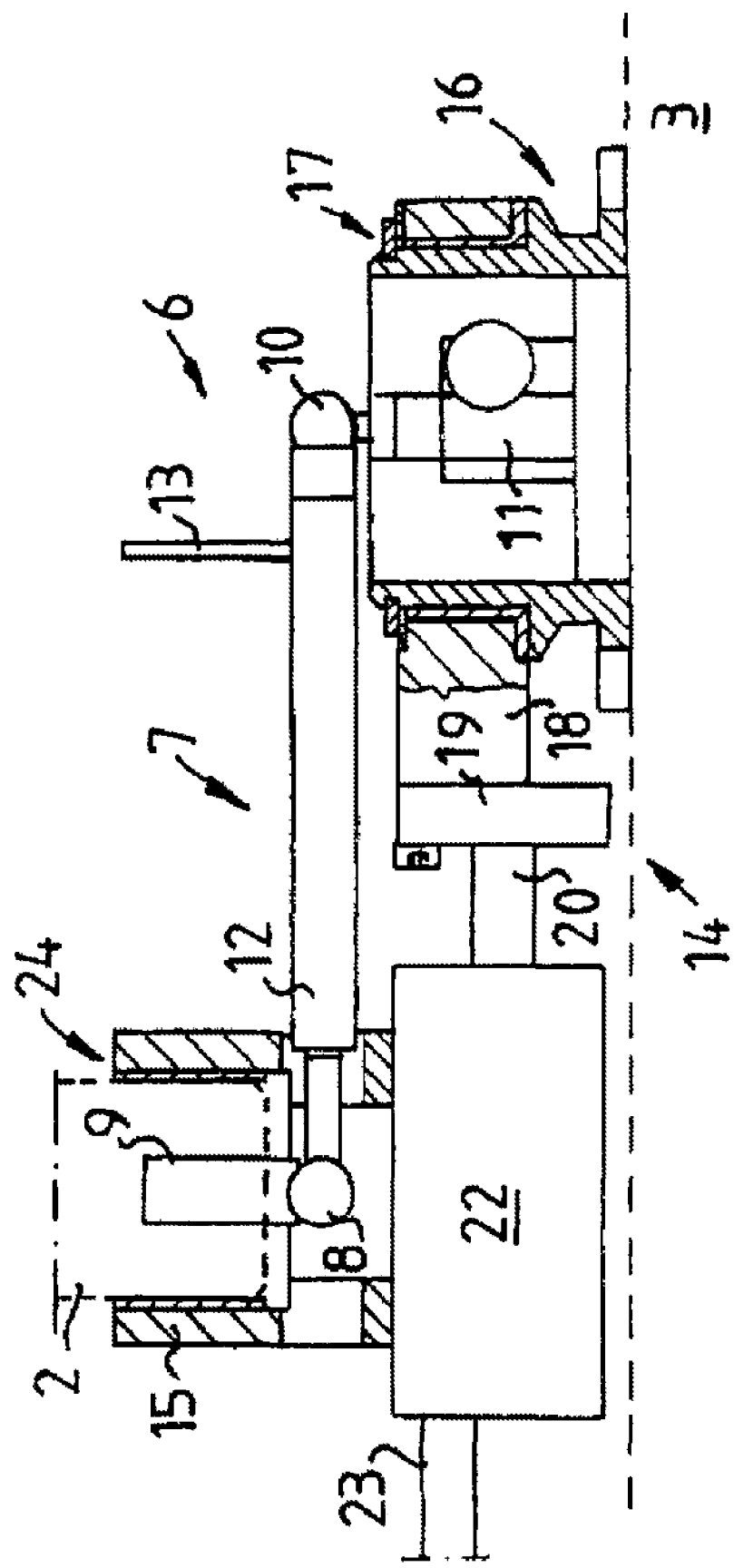

According to FIGS. 2a and 2b, the test assembly 6 incorporates a conventional measuring arm 7 of the "ball bar" type, which has one of its ends linked by an articulation 8 to a bracket 9 intended to be secured in the second element 2 of the machine 1, and has its other end linked via an articulation 10 to a bracket 11 intended to be fixed relative to the second element 3. A telescopic element 12 links the two articulations 8 and 10 and is provided internally with measuring equipment (not depicted) for recording changes in the distance between the articulations 8 and 10. The measuring arm 7 and its measuring equipment can be connected by an electrical line 13 to suitable external equipment for recording and analysis of measurement results.

The test assembly 6 also incorporates a power unit 14 which, like the measuring arm 7, is intended to be fixed between the first element 2 and the second element 3. For this purpose there is not only a bracket 15 for fixing to the first element 2 but also a bracket 16 for fixing to the second element 3. Via a bearing 17 the bracket 16 supports a pivotingly mounted arm 18 which has its free end connected to a yoke 19 in which piston rods 20, 21 to two working cylinders arranged in a cylinder housing 22 are fastened. The cylinder housing 22 is provided with working medium via a line 23 and is fixed to the holder 15 which is intended to be pivotable about the first element 2 via a bearing 24.

The power unit 14 can be used to apply a force in either direction, parting or drawing together the two brackets 15 and 16, and hence also the first element 2 and the second element 3, when the test assembly 6 is fitted for use according to FIG. 1. The measuring arm 7 can at the same time be used to ascertain the magnitude of the resulting displacements between the elements 2 and 3.

A test assembly according to the invention can be used with basically any kind of mechanical structure. It could be part of a machine tool (as described here) as well as of various kinds of robots or coordinate measuring machines.

Figure 3A:
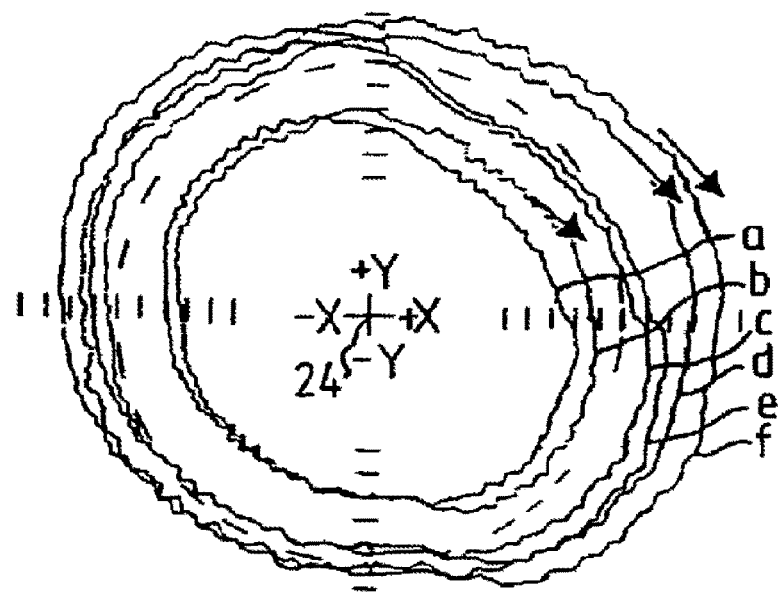
FIGS. 3a-b show deflection in various directions between machine elements at various loads.
Figure 3B:
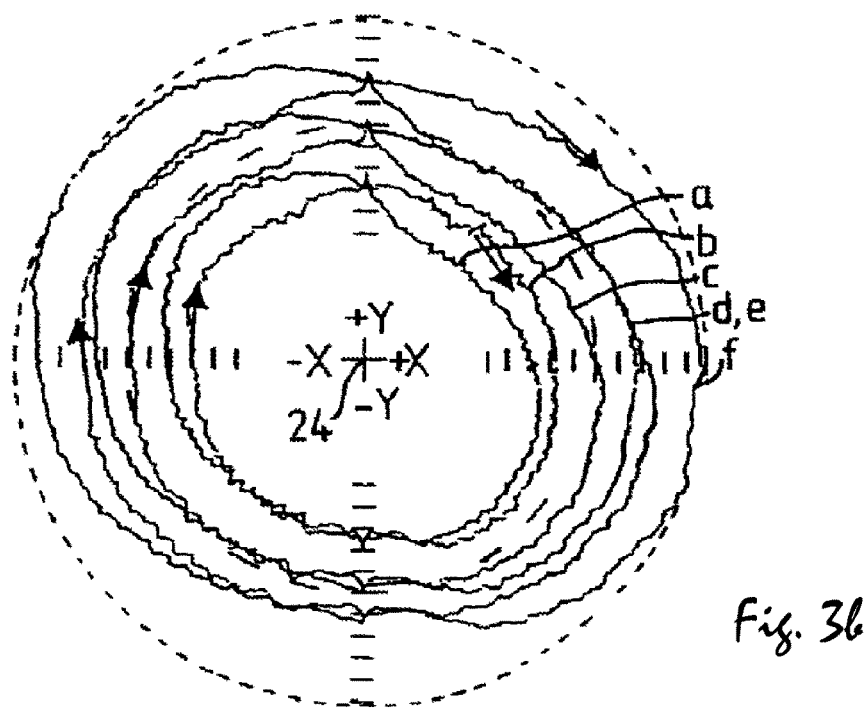

FIGS. 3a and 3b show the results of two test series. The results of a first test series are depicted schematically in FIG. 3a, in which the machine 1 was programmed to cause the second element 3 to perform a circular movement about the first element 2 during simultaneous application of force between the elements 2 and 3. In this diagram, a coordinate system with X-axis and Y-axis has been placed with its centre 24 in the first element 2, and curves a-f show the magnitude of the deflection in various positions resulting from various amounts of force. In the case of curves b, d and f (provided with arrows) the movement was in a clockwise direction, while that depicted by the other curves a, c and e was in an anticlockwise direction. The force applied was 330N on curves a and b, 660N on curves c and d and 825N on curves e and f. The feed rate was 1000 mm/min in all cases. As can be seen, the amount of displacement increases with the amount of force applied but differently in different directions of movement.

FIG. 3b shows schematically the results of a test series in somewhat different conditions from the test series in FIG. 3a. In this case the feed rate was increased to 5000 mm/min. The force applied for curves a-d was the same as in FIG. 3a but was increased to 990N for curves e and f. Here again the amount of deflection increases with the amount of force applied and differs in different directions, but not in the same way as in FIG. 3a.

The diagrams in FIGS. 3a and 3b may be said to constitute the machine's "fingerprint" in various situations and provide, inter alia, information on how its rigidity (or stiffness) varies in different directions at different amounts of load. They also provide a picture of the precision with which the machine can perform a certain type of movement under given conditions.

Figure 4:
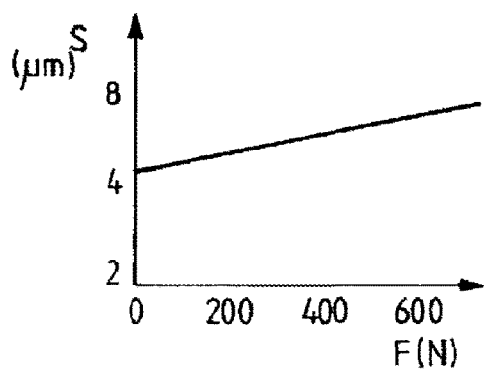
FIG. 4 shows a load diagram.

Another type of test result is depicted in FIG. 4, where the change in rectilinearity S, measured in μm (micrometers), is shown as a function of the magnitude of the force applied F, indicated in N (newtons). It shows that the change is linear.

It is obvious that further types of tests may provide further types of information about the machine. It is possible, for example, in a specified mutual position between the first element 2 and the second element 3, to carry out measurements both with force increase and with force decrease in order to gain an assessment of hysteresis in the measuring system. This makes it possible to find out how to compensate internal friction and elasticity in the measuring system with a view to immediately produce reliable measuring results.

For precision reasons, the bearings 17 and 24 used must have good accuracy, i.e. minimum play, and, at the same time, low friction. Sliding or rolling bearings, e.g. needle bearings, may be suitable for the purpose but magnetic or hydrostatic bearings are also attractive, although expensive.

The movements described above were in a substantially horizontal plane but there is of course nothing to prevent analysis of movements in a plane with a different orientation, e.g. vertical. An improved version of the conventionally made articulations 8 and 10, with a view to enabling them to absorb sufficiently large forces, may make it possible to integrate the power unit 14 with the telescopic element 12. It is also possible at the same time to make the articulations 8 and 10 movable in three dimensions in order to be able to carry out testing in any desired direction. An integrated version makes for easier fitting and removal.

Signal transmission from the measuring arm 7 is here depicted via an electrical line 13 but other versions are of course conceivable, e.g. using some kind of wireless transmission (such as Bluetooth or WiFi transmission) to avoid problems with electrical lines during rotary movements.

In the case of the machine tool depicted in FIG. 1, the first element 2 is fixed while the second element 3 is movable in a plane perpendicular to the plane of the drawing. There is of course nothing to prevent the second element 3 being fixed instead while the first element 2 may be movable. A combination of such movements is also possible, depending on what is necessary and desirable in the particular case.

The power unit 14 described above may within the scope of the invention also take a number of different forms, e.g. it is possible for the arm 18 to take the form of a cylinder housing instead. It is also possible for a single cylinder to be used instead of two, etc.

As previously indicated, the two brackets 15 and 16 are to make it possible to use the power unit 14 to load the first element 2 and the second element 3, so said brackets have within the scope of the invention to be adapted as appropriate to the particular type of machine.

Diagrams of the type depicted in FIGS. 3a, 3b and 4 may be used for calculating a large number of different parameters which characterise the machine's behaviour under load. Precision in circular movement can be read off, but precision in linear movements and various types of composite movement can also be calculated. The amount of force dependency provides a good measure of the machine's quality in that little force dependency indicates good quality and good precision, whereas great force dependency indicates less good quality and inferior precision.

In addition, the measured values arising from testing a certain machine tool according to the invention may be used for imposing corrections to rectify deflection in various load situations in the control programme for the machine concerned. The machine's accuracy might thus be substantially improved. The economic gains might become significant if relatively inexpensive machines could therefore be used instead of more expensive high-precision machines. Said measured values obtained may also be used in digital Simulation of the actual machining process to provide a more realistic picture of that process.

Figure 5:
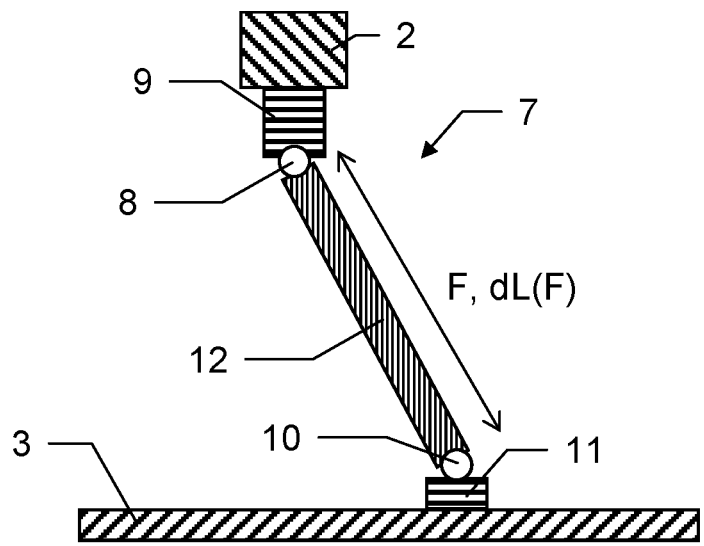
FIG. 5 shows a schematic representation of a measuring arm illustrating the working principle of a prior art test assembly.
Figure 6:
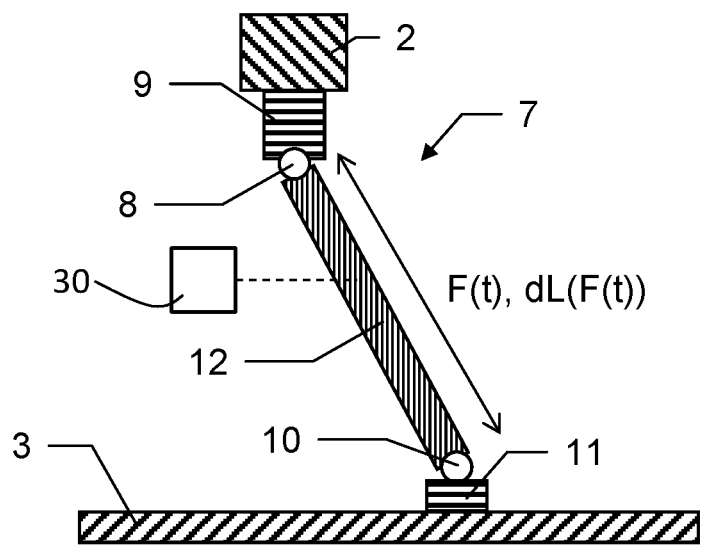
FIG. 6 shows a schematic representation of a measuring arm illustrating the working principle of an example embodiment of a test assembly according to the invention.

FIGS. 5 and 6 each show a schematic representation of a measuring arm 7 of a test assembly, illustrating the working principles of a test assembly of the prior art and of a test assembly according to the invention.

The measuring arm 7 of the assembly of FIG. 5 is fixed to a machine spindle 2 by means of a first bracket 9 and a first articulation 8, and to a machine table 3 by means of a second bracket 11 and a second articulation 10. A power unit of the assembly (not shown here) is adapted to apply a static force F between the two articulations 8 and 10, and the measuring arm 7 comprises a telescopic element 12, the length change dL(F) of which is then determinable. If the machine spindle 2 performs a movement around the second articulation 10 at the machine table 3 that would be a perfect circle when F=0, the measurement will show that due to stiffness the movement will not be circular when F>0. Such an assembly is known from the art and described in US 2002/0189379 A1.

FIG. 6 illustrates the working principle of an example embodiment of an assembly according to the invention. With the assembly of FIG. 6 a dynamic measurement is introduced. The depicted elements of the measuring arm 7 are the same as in FIG. 5.

The power unit (not shown) of the assembly of FIG. 6 is adapted to generate a dynamic, time varying force F(t) between the two articulations 8 and 10 by means of a piezo actuator 30. From the perspective of the machine, this can be regarded as a force vector dependent on the relative position between the two articulations 8 and 10. Accordingly, the measuring arm 7 is adapted to measure the varying length vector dL(F(t)) that in the same way will result in varying stiffness in different directions.

The applied force F comprises a static component $F_0$ and a dynamic component F(t). The latter is time variant, e.g. sinusoidal or comprising a step function. The predetermined force can thus be defined as $F=F_0+F(t)$. This means that a dynamic force F(t) is applied in combination with a static force $F_0$ (where the static force can be $F_0 \geq 0$). Optionally, the dynamic component F(t) is designed so that, when observing the system from outside, it behaves as if it would have a negative damping.

With the assembly and method according to the invention, it is possible to measure a stiffness in different directions based on the applied force vector of the dynamic force F(t) and deflection vector dL(F). This means that the output comprises the static stiffness (with a constant applied force) as well as the dynamic stiffness (with a time-varying force F(t)) and the damping.

The static force $F_0$ and the dynamic force can be generated by the same means or separately, e.g. the static force by means of at least one working cylinder of the power unit (as described with respect to FIGS. 2a and 2b) and the dynamic force by means of a piezo actuator.

Optionally, the method comprises one or more measurement operations, each of which comprising moving the machine spindle 9 relative to the machine table 3 in a settable pattern of movement and recording the resulting actual movement path. As described with respect to FIGS. 3a and 3b, this can be a rotational movement with different forces applied by the test assembly. The predetermined force F applied during each of the one or more measurement operation comprises a dynamically varying portion F(t), so that the applied force varies dynamically during each of the measurement operations. Optionally, as shown in FIGS. 3a and 3b for a static applied force, also the dynamically varying force can be different for each measurement operation.

Preferably, the measuring part for measuring the deflection vector dL(F) and the force-generation part can be designed to be independent components. This means that if the force-generation part is affected by friction or creates deflections in the device, the measuring part will not be affected by these defects and be able to measure the true deflections on the machine.

Optionally, the test assembly can be used with a rotating spindle, e.g. fixed to the spindle by means of a special adaptor, as the stiffness in the spindle varies with the rotational speed. In this case, the forces are applied and the measurement is performed during the rotation of the rotating spindle.

Optionally, the test assembly can also be used for measuring the stiffness in fixtures that are used for holding the workpiece in its place.

In some embodiments, the assembly can be battery operated.

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for determining machine parameters of a mechanical device in which a first element and a second element are mutually movable in settable patterns of movement, the method comprising:
   placing a measuring arm between the first and second elements,
   displacing the first and second elements mutually in a predetermined intended movement path,
   applying a predetermined force between the first element and the second element substantially in a longitudinal direction of the measuring arm,
   recording, while the predetermined force is applied, a resulting actual movement path by means of the measuring arm,
   determining a difference between the intended movement path and the actual movement path, and
   deriving, based on the determined difference, machine parameters indicating a condition of the mechanical device,
   wherein the predetermined force is generated by a power unit and comprises a dynamically varying portion and a static portion that are generated separately, wherein the dynamically varying portion is generated at least partially by a piezo actuator of the power unit,
   wherein:
   the predetermined force is applied in various mutual positions between the first and second elements, the dynamically varying portion being position dependent, and
   recording the resulting actual movement path comprises dynamically determining a current length or a length difference of the measuring arm while the predetermined force is applied.

2. The method according to claim 1, wherein the dynamically varying portion is sinusoidal, subject to an analytic function or subject to a step function.

3. The method according to claim 2, wherein the dynamically varying portion is position dependent and sinusoidal.

4. The method according to claim 1, comprising:
   at least one measurement operation comprising moving the first and second elements mutually in a settable pattern of movement and recording the resulting actual movement path, the predetermined force applied during each measurement operation comprising the dynamically varying portion, so that an applied force varies dynamically during each measurement operation, wherein the applied dynamically varying force is different for each measurement operation.

5. The method according to claim 4, wherein the at least one measurement operation comprises a plurality of subsequently performed measurement operations.

6. The method according to claim 1, wherein the predetermined force is defined as $$F=F_0+F(t),$$

where F is the predetermined force, $F_0$ is the static portion of the force and F(t) is the dynamically varying portion of the force.

7. The method according to claim 1, wherein the machine parameters comprise at least one of the following:
stiffness in at least two directions based on an applied force vector and on a deflection vector;
displacement in dependence of a direction of movement;
hysteresis;
recti linearity; and/or
damping.

8. The method according to claim 7, wherein the stiffness comprises a dynamic stiffness value.

9. The method according to claim 1, wherein
the mechanical device is a machine tool, wherein the first element is adapted to support a machining tool, and the second element is adapted to support a workpiece,
wherein the second element is adaptive to provide a fixation for holding the workpiece in its place, and
wherein the machine parameters comprise a stiffness of the fixation.

10. The method according to claim 1, wherein the second element is adapted to provide a fixation for holding a workpiece or an object to be measured, respectively, in its place, by means of clamping.

11. The method according to claim 1, wherein the mechanical device is a machine tool, and the method comprises a tooling simulation of a specific tooling operation of the machine tool, in the course of which
mutual movements between the first element and the second element are performed that are typical for the tooling operation, and
the dynamically varying portion is applied according to forces typically occurring during the tooling operation.

12. The method according to claim 1, wherein the first element is a spindle and the second element is a worktable.

13. The method according to claim 1, wherein the measuring arm is telescopic.

14. The method according to claim 1, wherein the mechanical device is a coordinate measuring machine, wherein the first element is adapted to support a measuring head, and the second element is adapted to support an object to be measured.

15. An assembly for determining machine parameters of a mechanical device in which a first element and a second element are mutually movable, the assembly comprising:
a measuring arm which has at its ends fastening devices for articulated fixing to articulations of the first element and the second element respectively, the measuring arm comprising a telescopic element that links the articulations and measuring equipment for recording changes in the distance between the articulations to make it possible to measure positional change between the first element and the second element while a predetermined force is being applied, and
a power unit that is arranged to apply the predetermined force substantially parallel with the measuring arm to the first element and the second element, the power unit being arranged to apply the predetermined force that comprises at least a dynamically varying portion and a static portion, wherein the dynamically varying portion and the static portion are generated separately by the power unit, wherein the power unit comprises at least one piezo actuator that is adapted to generate the dynamically varying portion,
wherein:
the power unit is arranged to apply the predetermined force in various mutual positions between the first and second elements, and to apply the dynamically varying portion dependent on the position, and
the assembly is arranged to record a resulting actual movement by dynamically determining a current length or a length difference of the measuring arm while the predetermined force is applied.

16. The assembly according to claim 15, wherein the dynamically varying portion is sinusoidal, subject to an analytic function or subject to a step function.

17. The assembly according to claim 15, wherein
the power unit is provided with a first bracket for fixing to the first element and with a second bracket for fixing to the second element, wherein the first and second brackets are each provided with a bearing allowing rotation of the power unit, wherein the second bracket is provided with devices for fixing one end to the measuring arm.

18. The assembly according to claim 15, wherein the first element is a rotating spindle, wherein the assembly
is adapted to measure a stiffness of the spindle, the stiffness varying with a rotational speed of the spindle.

19. The assembly according to claim 15, wherein the assembly is adapted to be operated cordless.

* * * * *